US012663975B2

(12) United States Patent
Mikell

(10) Patent No.: US 12,663,975 B2
(45) Date of Patent: Jun. 23, 2026

(54) SOFTWARE WIDGET INSTALLATION ON A CLIENT DEVICE

(71) Applicant: Capital One Services, LLC, McLean, VA (US)

(72) Inventor: Alec Mikell, Chapel Hill, NC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/415,764

(22) Filed: Jan. 18, 2024

(65) Prior Publication Data

US 2024/0152339 A1      May 9, 2024

Related U.S. Application Data

(63) Continuation of application No. 17/171,831, filed on Feb. 9, 2021, now Pat. No. 11,886,853.

(51) Int. Cl.
| | |
|---|---|
| *G06F 8/61* | (2018.01) |
| *G06F 3/0482* | (2013.01) |
| *G06F 16/953* | (2019.01) |
| *H04L 67/02* | (2022.01) |

(52) U.S. Cl.
CPC .............. *G06F 8/61* (2013.01); *G06F 3/0482* (2013.01); *G06F 16/953* (2019.01); *H04L 67/02* (2013.01)

(58) Field of Classification Search
CPC ........ G06F 8/61; G06F 16/953; G06F 3/0482; G06F 3/0481; G06F 9/4451; G06F 40/106; H04L 67/02
See application file for complete search history.

(56) References Cited

U.S. PATENT DOCUMENTS

| | | |
|---|---|---|
| 9,104,294 B2 | 8/2015 | Forstall et al. |
| 9,646,104 B1 | 5/2017 | Canavor et al. |
| 10,732,952 B1 | 8/2020 | Yu et al. |
| 2009/0288004 A1 | 11/2009 | Strandell et al. |

(Continued)

FOREIGN PATENT DOCUMENTS

WO      WO-2014103307 A1 *   7/2014   ........... G06F 3/0484

OTHER PUBLICATIONS

Rizo E et al., "Automatic Identification of Widgets and Their Subcomponents Based on a Classification Pipeline for DOM Mutation Records," Association for Computing Machinery, 2019, pp. 1-10.

(Continued)

*Primary Examiner* — S. Sough
*Assistant Examiner* — Cuong V Luu
(74) *Attorney, Agent, or Firm* — Harrity & Harrity, LLP

(57) ABSTRACT

In some implementations, a client device receives, from a developer system, a page link to obtain a plurality of related software widgets. The client device receives, via a graphical user interface of the client device, a selection of the page link. The client device receives, from the developer system, metadata associated with the page link. The client device receives the plurality of related software widgets based on the metadata. The client device installs the plurality of related software widgets on the client device. The plurality of related software widgets is configured to be displayed on a next available navigation pane window of the graphical user interface in accordance with corresponding sizes and positions indicated in the metadata.

20 Claims, 8 Drawing Sheets

(56) References Cited

U.S. PATENT DOCUMENTS

| | | |
|---|---|---|
| 2011/0173602 A1 | 7/2011 | Togami et al. |
| 2012/0030596 A1 | 2/2012 | Hanes |
| 2016/0057029 A1 | 2/2016 | Iida et al. |
| 2016/0246490 A1 | 8/2016 | Cabral |
| 2018/0349516 A1 | 12/2018 | Dutta et al. |
| 2020/0409724 A1 | 12/2020 | Dimascio et al. |
| 2022/0253295 A1 | 8/2022 | Mikell |

OTHER PUBLICATIONS

Ye J., et al., "An Empirical Study of GUI Widget Detection for Industrial Mobile Games," Association for Computing Machinery, 2021, pp. 1427-1437.

\* cited by examiner

```json
{
  "name": "Personal Finance Widget Experience - User Group 3",
  "widgets": [
    {
      "name": "Checking Account Widget",
      "url": "http://www.brand.appstore.com/widget?id=839210",
      "size": "medium (2x2)",
      "position": {"x": 1, "y": 1}
    },
    {
      "name": "Credit Score Widget",
      "url": "http://www.brand.appstore.com/widget?id=617721",
      "size": "medium (2x2)",
      "position": {"x": 3, "y": 1}
    },
    {
      "name": "Savings Goals Widget",
      "url": "http://www.brand.appstore.com/widget?id=442718",
      "size": "wide (4x1)",
      "position": {"x": 1, "y": 3}
    }
  ],
  "operatingSystem": "Generic-Phone-Brand OS 14.2",
  "assembleWidgetsOnNextPage": true,
  "tags": {
    "WidgetExperienceNumber": 100
  }
}
```

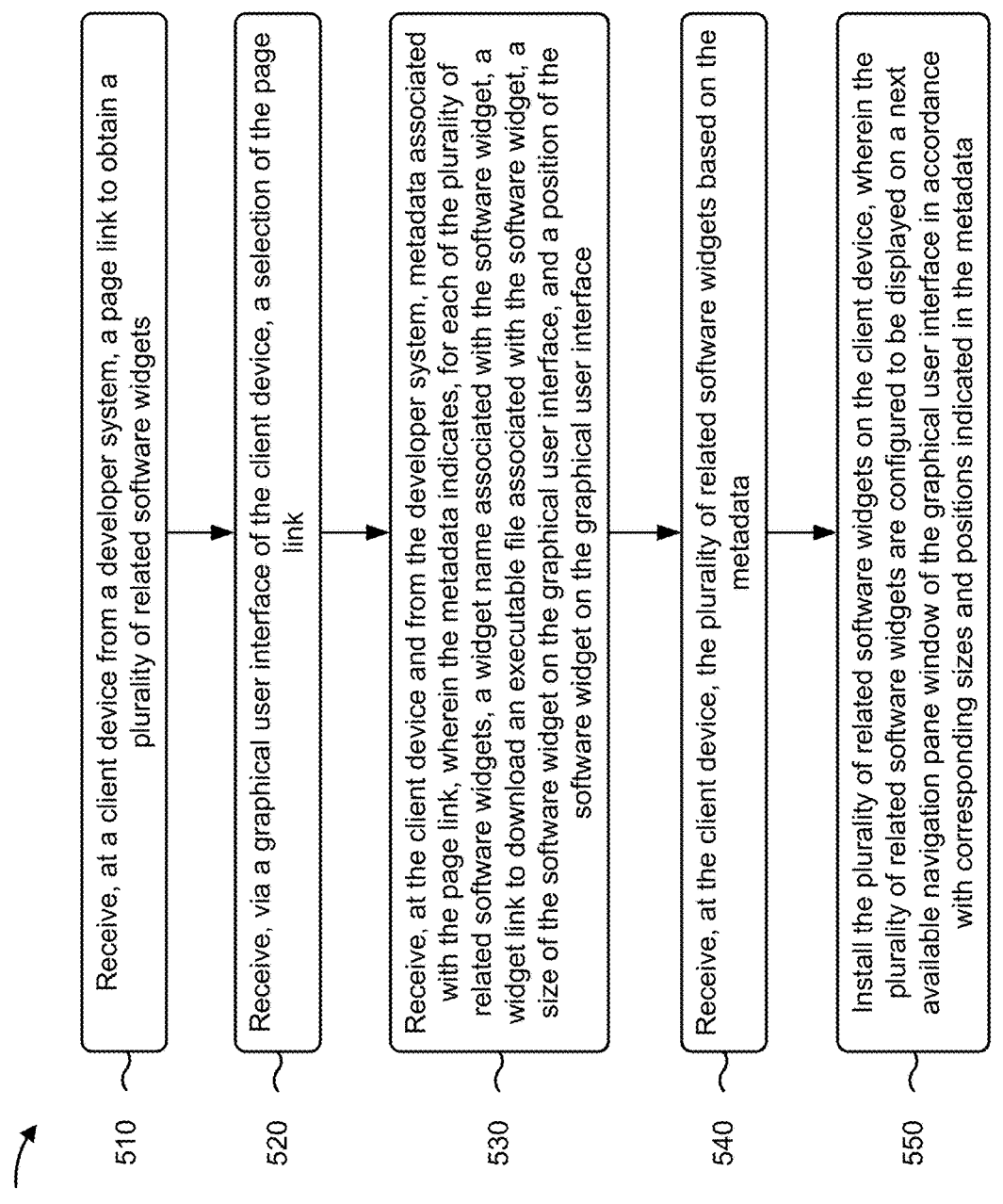

500

510  Receive, at a client device from a developer system, a page link to obtain a plurality of related software widgets 520  Receive, via a graphical user interface of the client device, a selection of the page link 530  Receive, at the client device and from the developer system, metadata associated with the page link, wherein the metadata indicates, for each of the plurality of related software widgets, a widget name associated with the software widget, a widget link to download an executable file associated with the software widget, a size of the software widget on the graphical user interface, and a position of the software widget on the graphical user interface 540  Receive, at the client device, the plurality of related software widgets based on the metadata 550  Install the plurality of related software widgets on the client device, wherein the plurality of related software widgets are configured to be displayed on a next available navigation pane window of the graphical user interface in accordance with corresponding sizes and positions indicated in the metadata

FIG. 5

SOFTWARE WIDGET INSTALLATION ON A CLIENT DEVICE

RELATED APPLICATION

This application is a continuation of U.S. patent application Ser. No. 17/171,831, filed Feb. 9, 2021 (now U.S. Pat. No. 11,886,853), which is incorporated herein by reference in its entirety.

BACKGROUND

Software widgets are relatively simple software applications that provide information via a graphical user interface. Software widgets may consume relatively few processing and memory resources, and may run on various types of computing devices, such as desktop computers, laptop computers, mobile phones, etc. Software widgets may be background processes that provide users with quick access to information, such as the latest news, current weather, calendar information, battery status information, etc. Software widgets may provide the information via the graphical user interface without requiring users to open applications that manage the information.

SUMMARY

In some implementations, a system for software widget installation includes one or more memories; and one or more processors, communicatively coupled to the one or more memories, configured to: receive, at a client device and from a developer system, an electronic page that includes a page link associated with a plurality of related software widgets, wherein a software widget included in the plurality of related software widgets is a background process that is configured to execute on the client device and display information via a graphical interface of the client device, and wherein the plurality of related software widgets correspond to a common topic; display, via the graphical user interface of the client device, the electronic page that includes the page link; receive, via the graphical user interface of the client device, a selection of the page link on the electronic page; receive, at the client device and from the developer system, metadata associated with the page link based on the selection of the page link on the electronic page, wherein the metadata indicates, for each of the plurality of related software widgets, a widget name associated with the software widget, a widget link to download an executable file associated with the software widget, a size of the software widget on the graphical user interface, and a position of the software widget on the graphical user interface; parse, at the client device, the metadata to identify, for each of the plurality of related software widgets, the widget link associated with the software widget, the size of the software widget, and the position associated with the software widget; receive, at the client device, the plurality of related software widgets based on the metadata, wherein widget links included in the metadata are accessed to download the plurality of related software widgets onto the client device; and install the plurality of related software widgets on the client device, wherein the plurality of related software widgets are configured to be displayed on a next available navigation pane window of the graphical user interface in accordance with corresponding sizes and positions indicated in the metadata, and wherein the corresponding sizes and positions are based on priority levels associated with software widgets in relation to other software widgets in the plurality of related software widgets.

In some implementations, a method of software widget installation includes generating, at a developer system, a page link associated with a plurality of software widgets, wherein a software widget included in the plurality of software widgets is a background process that is configured to execute on a client device and display information via a graphical interface of the client device; associating, at the developer system, metadata with the page link, wherein the metadata indicates, for each of the plurality of software widgets, a widget name associated with the software widget, a widget link to download an executable file associated with the software widget, a size of the software widget on the graphical user interface, and a position of the software widget on the graphical user interface, and wherein sizes and positions corresponding to the plurality of software widgets are based on priority levels associated with software widgets in relation to other software widgets in the plurality of software widgets; transmitting, from the developer system to the client device, an electronic page that includes the page link to the metadata; receiving, at the developer system from the client device, a selection of the page link on the electronic page; and transmitting, from the developer system to the client device, the metadata associated with the page link based on the selection of the page link on the electronic page, wherein the metadata enables the plurality of software widgets to be installed and displayed on a next available navigation pane window of the graphical user interface.

In some implementations, a non-transitory computer-readable medium storing a set of instructions includes one or more instructions that, when executed by one or more processors of a device, cause the device to: receive, at a client device from a developer system, a page link to obtain a plurality of related software widgets; receive, via a graphical user interface of the client device, a selection of the page link; receive, at the client device and from the developer system, metadata associated with the page link, wherein the metadata indicates, for each of the plurality of related software widgets, a widget name associated with the software widget, a widget link to download an executable file associated with the software widget, a size of the software widget on the graphical user interface, and a position of the software widget on the graphical user interface; receive, at the client device, the plurality of related software widgets based on the metadata; and install the plurality of related software widgets on the client device, wherein the plurality of related software widgets are configured to be displayed on a next available navigation pane window of the graphical user interface in accordance with corresponding sizes and positions indicated in the metadata.

BRIEF DESCRIPTION OF THE DRAWINGS

FIG. 2 is a diagram of an example implementation of metadata relating to installing a software widget on a client device.

FIG. 5 is a flowchart of an example process relating to installing a software widget on a client device.

DETAILED DESCRIPTION

Figure 1A:
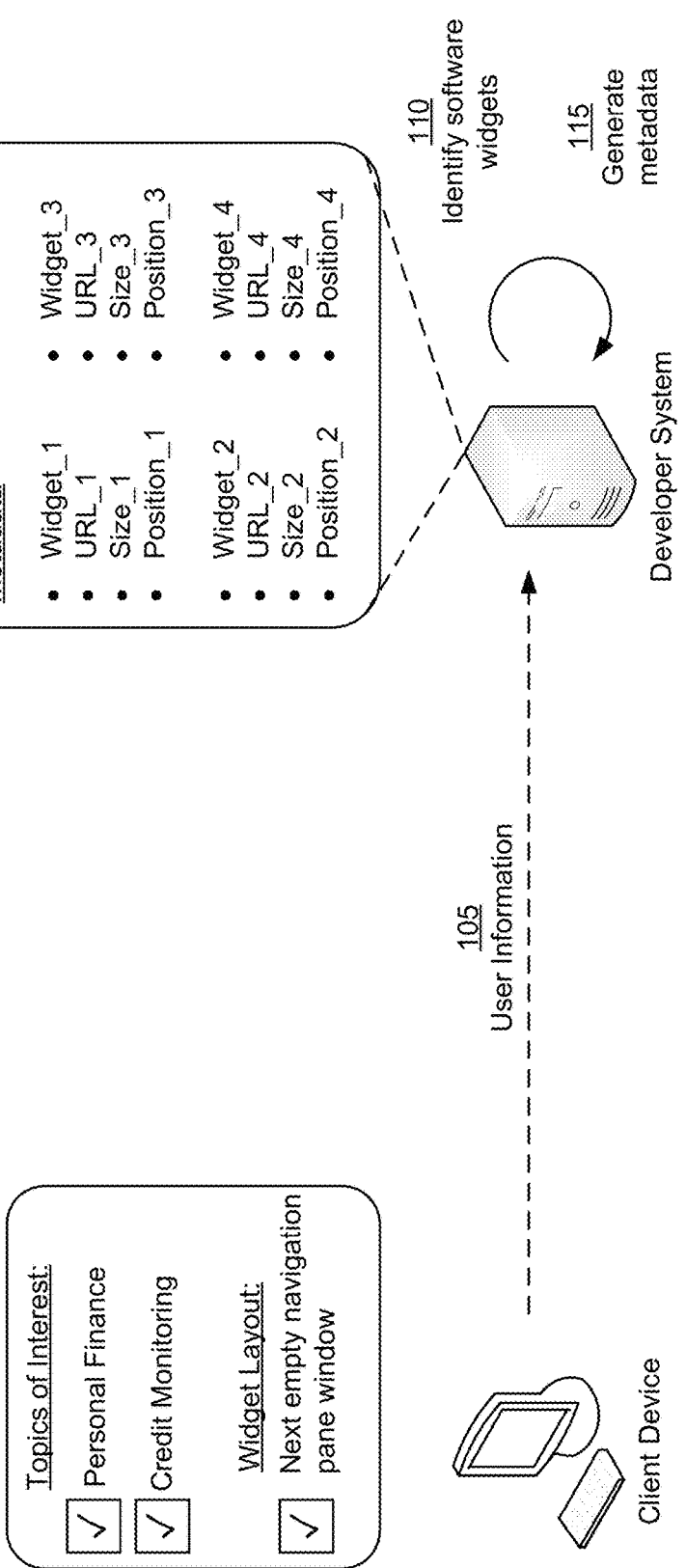
FIGS. 1A-1D are diagrams of an example implementation relating to installing a software widget on a client device.

The following detailed description of example implementations refers to the accompanying drawings. The same reference numbers in different drawings may identify the same or similar elements.

Software widgets may be background processes that are displayed on a graphical user interface of a client device, such as on a navigation pane window. The navigation pane window may include a background page that allows users to view the software widgets, access applications installed on the client device, access settings, view information (e.g., a network signal strength, a current time, and/or a remaining battery level), etc. Software widgets may utilize less processing and memory resources as compared to more-complex applications that run on the client device. Software widgets may provide a user with quick access to information, without having the user open an application that manages the information. In other words, software widgets may provide information at-a-glance, without the user having to perform multiple steps to access the information.

As an example, the client device may have a weather application, as well as a weather software widget that corresponds to the weather application. The user may open the weather application on the client device to view upcoming weather for the next week, view a sunrise time and a sunset time for the current today, etc. However, to consume more basic information, such as the current temperature, the user may not open the weather application, but rather may view the weather software widget which may be run on the background page of the client device. The weather software widget may conveniently display the current temperature, and the user may not open the weather application to obtain this information.

A software installation process may involve the client device receiving a search query from the user via the graphical user interface. The client device may send the search query to a search engine. The search engine may search a database of software widgets and identify one or more software widgets that correspond to the search query. Search results that include the one or more software widgets may be sent to the client device. The search results may be presented to the user via the graphical user interface. An indication of a software widget included in the search results may be selected via the graphical user interface, and the software widget may be downloaded and installed on the client device.

One problem when installing a new software widget is that the software widget may be automatically inserted on a navigation pane window that was last accessed on the client device. The software widget may be associated with a size on the graphical user interface that is several times larger than application icons shown on the graphical user interface, so the installation of the software widget may cause other application icons to be moved to a next navigation pane window. As a result, the user may have to manually rearrange the software widget and/or the application icons. Causing a user to manually rearrange software widgets and/or application icons in this manner wastes compute and network resources.

For example, a software widget may consume a size on the graphical user interface equivalent to eight application icons, so when the software widget is installed on a navigation pane window that is nearly full of software widgets and/or application icons, the installation of the software widget may cause some application icons to be moved to the next navigation pane window.

Another problem is that the user may need to manually search for and install each software widget, even when the software widgets are related software widgets provided by a same developer system. For example, a financial services developer system may provide separate software widgets for viewing an account status, accessing a credit score, setting savings goals, and providing payment reminders. Since all four of these software widgets are related to financial services, the user may wish to install all four of the software widgets on the client device. However, the user may have to manually search for and install each of the four software widgets individually, thereby making the installation process more burdensome and time consuming. Causing a user to manually search for and install software widgets in this manner wastes compute and network resources.

In some implementations described herein, to solve the problems described above, as well as a related technical problem of how to create a link that enables a client device to automatically download and install software widgets, while arranging the software widgets post-installation on a navigation pane window in accordance with a predefined layout, a technical solution is described herein for generating metadata that enables the client device to automatically download and install software widgets in accordance with the predefined layout. The client device may receive an electronic page that includes the page link, such as a webpage or an electronic message. The client device may receive a selection of the page link via a graphical user interface of the client device. The client device may access, based on the selection of the page link, a uniform resource locator (URL) associated with the page link to retrieve the metadata. In other words, the client device may receive the metadata based on accessing the URL associated with the page link. The metadata may indicate a name for each of the software widgets, a URL for accessing each of the software widgets, a size on the graphical user interface for each of the software widgets, and/or a position on the graphical user interface for each of the software widgets. The software widgets may be related to a common topic. The client device may parse the metadata to identify the URLs, the sizes, and the positions of corresponding software widgets. The client device may download the software widgets based on corresponding URLs indicated in the metadata. The client device may display the software widgets on a next available navigation pane in accordance with corresponding sizes and positions indicated in the metadata.

In some implementations, the user may not manually search for and install software widgets, nor may the user manually configure the software widgets, which may involve rearranging the software widgets via the graphical user interface after the installation. Rather, the client device may receive the page link, and based on a selection of the page link, the client device may receive metadata that enables the client device to download, install, and/or configure a display of the software widgets. As a result, the client device may save compute and network resources by not accessing a plurality of electronic pages (e.g., search results) indicating available software widgets, many of which may be irrelevant to the user. Further, the user may reduce the time involved in searching, downloading, and/or configuring the software widgets on the client device, which also saves compute and network resources.

FIGS. 1A-1D are diagrams of an example 100 relating to installing a software widget on a client device. As shown in FIGS. 1A-1D, example 100 includes a client device, a developer system, and an electronic marketplace system. These devices/systems are described in more detail in connection with FIGS. 3 and 4.

As shown in FIG. 1A, and by reference number 105, the client device may transmit user information to the developer system. The user information may be associated with a user of the client device. The user information may be transmitted to the developer system based on an electronic communication received from the developer system. The electronic communication may be a promotional message, survey, a form, etc., which may prompt the user to enter the user information via a graphical user interface of the client device, which may be transmitted from the client device to the developer system.

In some implementations, the user information may indicate topics of interest to the user (e.g., personal finance, credit monitoring). The user information may indicate demographic information associated with the user (e.g., gender, age, occupation). The user information may indicate a web browsing history of the user, a social media history of the user, a shopping history of the user, etc.

In some implementations, the user information may indicate widget layout preference information associated with the user. The widget layout preference information may correspond to an appearance of software widgets on the graphical user interface of the client device. The graphical user interface may include a navigation pane window. For example, the widget layout preference information may indicate that new software widgets are to be displayed on a next navigation pane window of the graphical user interface, which may correspond to an empty navigation pane window.

As shown by reference number 110, the developer system may identify software widgets based on the user information. The developer system may identify software widgets that may be of interest to the user from a list of possible software widgets based on the topics of interest, demographic information, web browsing history, social media history, shopping history, etc. associated with the user. The software widgets on the list of possible software widgets may be tagged with descriptors. The developer system may compare the topics of interest, demographic information, etc. with the descriptors to identify software widgets on the list that are possibly of interest to the user. In some cases, the software widgets identified based on the user information may all be related to a common topic.

In some implementations, the developer system may be associated with a webpage that is accessed by the client device of the user. The developer system may develop software widgets that are related to the webpage. In this case, the developer system may determine that the software widgets may be of interest to the user based on the webpage being accessed by the client device of the user.

As an example, the webpage may be a banking webpage, and the developer system may develop banking software widgets. In this example, the developer system may determine that the banking software widgets may be of interest to the user based on the banking webpage being accessed by the client device of the user.

As shown by reference number 115, the developer may generate metadata. The metadata may be a file (e.g., a text file) stored in a storage device of the developer system. The metadata may include information corresponding to the software widgets identified as potentially being of interest to the user of the client device. For example, for a given software widget, the metadata may indicate a widget name associated with the software widget. The metadata may indicate a widget link (e.g., a URL) to download an executable file associated with the software widget. The metadata may indicate a size of the software widget on the graphical user interface. The metadata may indicate a position of the software widget on the graphical user interface.

In some implementations, the size of the software widget on the graphical user interface may correspond to a unit of length, such as centimeters or millimeters, a number of pixels, etc. Alternatively, the size of the software widget on the graphical user interface may correspond to dimensions in relation to application icons shown on the graphical user interface. For example, a software widget having dimensions of 2×3 may correspond to an area on the graphical user interface that can hold six application icons.

In some implementations, the position of the software widget on the graphical user interface may be represented by coordination set information. The coordination set information may include one or more sets of coordinates that define the position of the software widget on the graphical user interface. For example, sets of coordinates may define the software widget to be displayed at an upper portion of the graphical user interface, a lower portion of the graphical user interface, a left portion of the graphical user interface, or a right portion of the graphical user interface.

As an example, the metadata may indicate, for a first software widget, a first widget name, a first widget link, a first widget size, and a first widget position. The metadata may indicate, for a second software widget, a second widget name, a second widget link, a second widget size, and a second widget position. The metadata may indicate, for a third software widget, a third widget name, a third widget link, a third widget size, and a third widget position. The metadata may indicate, for a fourth software widget, a fourth widget name, a fourth widget link, a fourth widget size, and a fourth widget position.

In some implementations, sizes of the software widgets and/or positions of the software widgets on the graphical user interface, as indicated in the metadata, may be based on a priority level associated with one software widget in relation to other software widgets. In other words, a size and/or position of a given software widget on the graphical user interface may vary depending on a priority level associated with the software widget. The metadata may indicate a certain size and/or position of a software widget based on the software widget corresponding to a certain priority level.

As an example, a first size of a first software widget may be larger than a second size of a second software widget on the graphical user interface based on the first software widget being associated with a higher priority as compared to the second software widget.

As another example, a first position of a first software widget may be closer than a second position of a second software widget to a prioritized display area of the graphical user interface based on the first software widget being associated with the higher priority as compared to the second software widget. The prioritized display area of the graphical user interface may be defined based on the metadata and/or the user information. The prioritized display area may correspond to an upper portion of the graphical user interface. The prioritized display area may correspond to a lower portion of the graphical user interface, which may be closer to a user's finger that is used to interact with the graphical user interface. The prioritized display area may correspond to a left portion or a right portion of the graphical user interface.

As yet another example, a first position of a first software widget may be above a second position of a second software widget on the graphical user interface based on the first software widget being associated with a higher priority as compared to the second software widget. Since the second software widget may have a lower priority as compared to the first software widget, the second position of the second software widget may be below the first position of the first software widget.

Figure 1B:
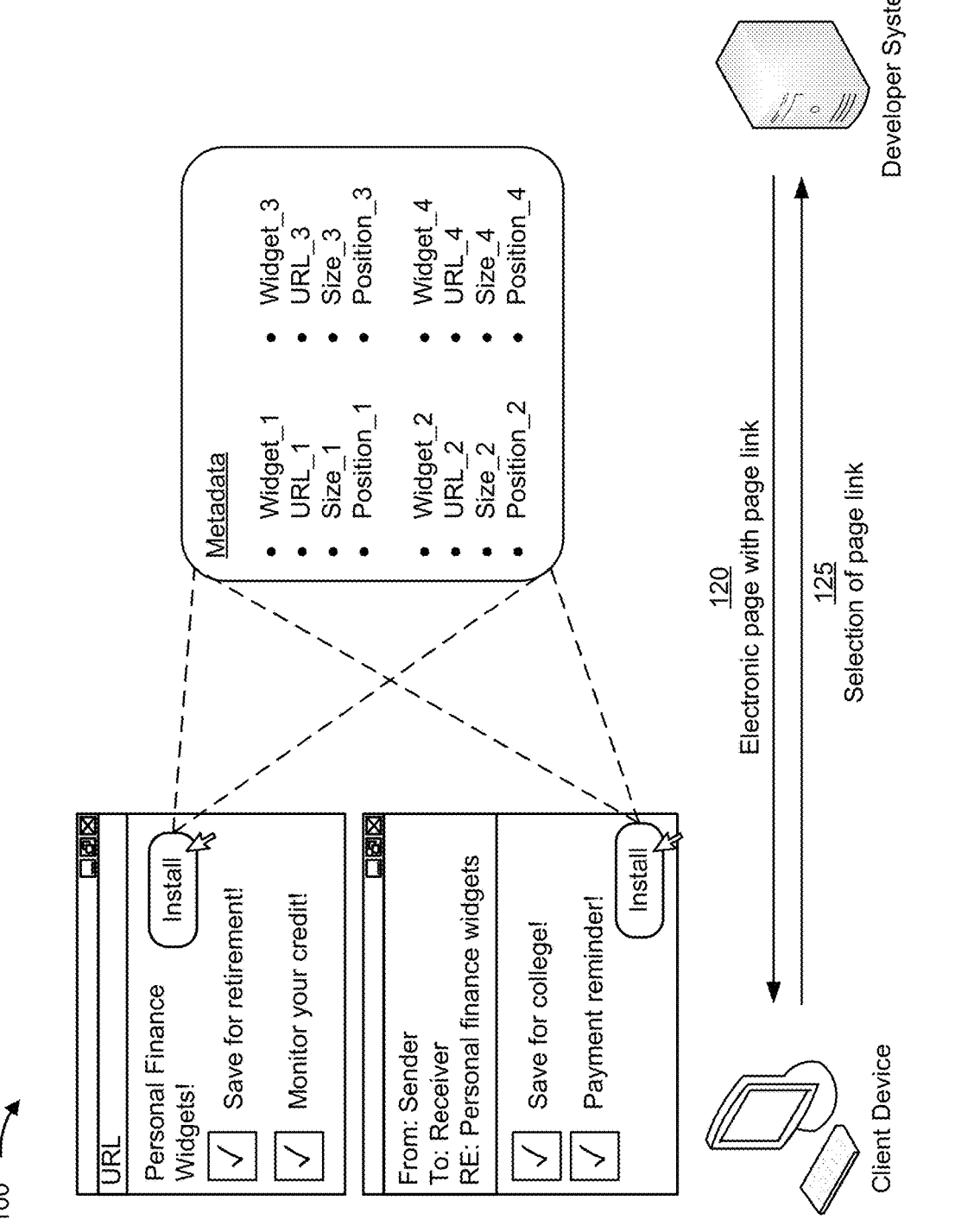

As shown in FIG. 1B, and by reference number 120, the developer system may transmit an electronic page to the client device. The electronic page may include information about the software widgets. For example, the electronic page may indicate various software widgets, and a description of features and benefits associated with each of the software widgets. The software widgets may be multiple software widgets that are related to a common topic (e.g., finance). Alternatively, the software widgets may be related to different topics, but may all be developed by the developer system. For example, the developer system may provide a suite of software widgets related to weather, battery usage, a calendar, and photos.

In some implementations, the electronic page may include a page link (e.g., a URL). For example, the electronic page may include a message that indicates that the page link may be selected (e.g., via an input device, such as a mouse or keyboard, or a touch screen) to obtain the software widgets. The page link may be associated with the metadata, which may be stored in the storage device of the developer system. In other words, the page link may be to the metadata stored in the storage device of the developer system, and by accessing the page link, the metadata may be retrievable by the client device.

In some implementations, the electronic page may be a website, which may be displayed vis the graphical user interface of the client device. For example, a web browser or another type of application that executes on the client device may receive the electronic page for display via the graphical user interface.

In some implementations, the electronic page may be an electronic message. The user of the client device may have an electronic message address that has been subscribed to a newsletter associated with the developer system. In this example, the developer system may transmit the electronic message containing promotional material and the page link, which may be displayed via the graphical user interface of the client device.

In some implementations, the developer system may transmit an electronic advertisement that includes the page link to the metadata. For example, the client device may be accessing a webpage via the web browser, and the developer system may transmit the electronic advertisement for display via the graphical user interface of the client device.

In some implementations, the client device may receive a search query via the graphical user interface of the client device. The search query may include one or more search terms that describe interests of the user. The client device may provide the search query to a search engine. The client device may receive, from the search engine, search results including the page link to obtain the software widgets. In other words, the search results may indicate software widgets that are potentially of interest to the user, based on the one or more search terms included in the search query.

As shown by reference number 125, the client device may transmit, to the developer system, an indication that the page link has been selected. For example, the user of the client device may select the page link via the graphical user interface of the client device, and the client device may transmit the indication of the selection to the developer system.

Figure 1C:
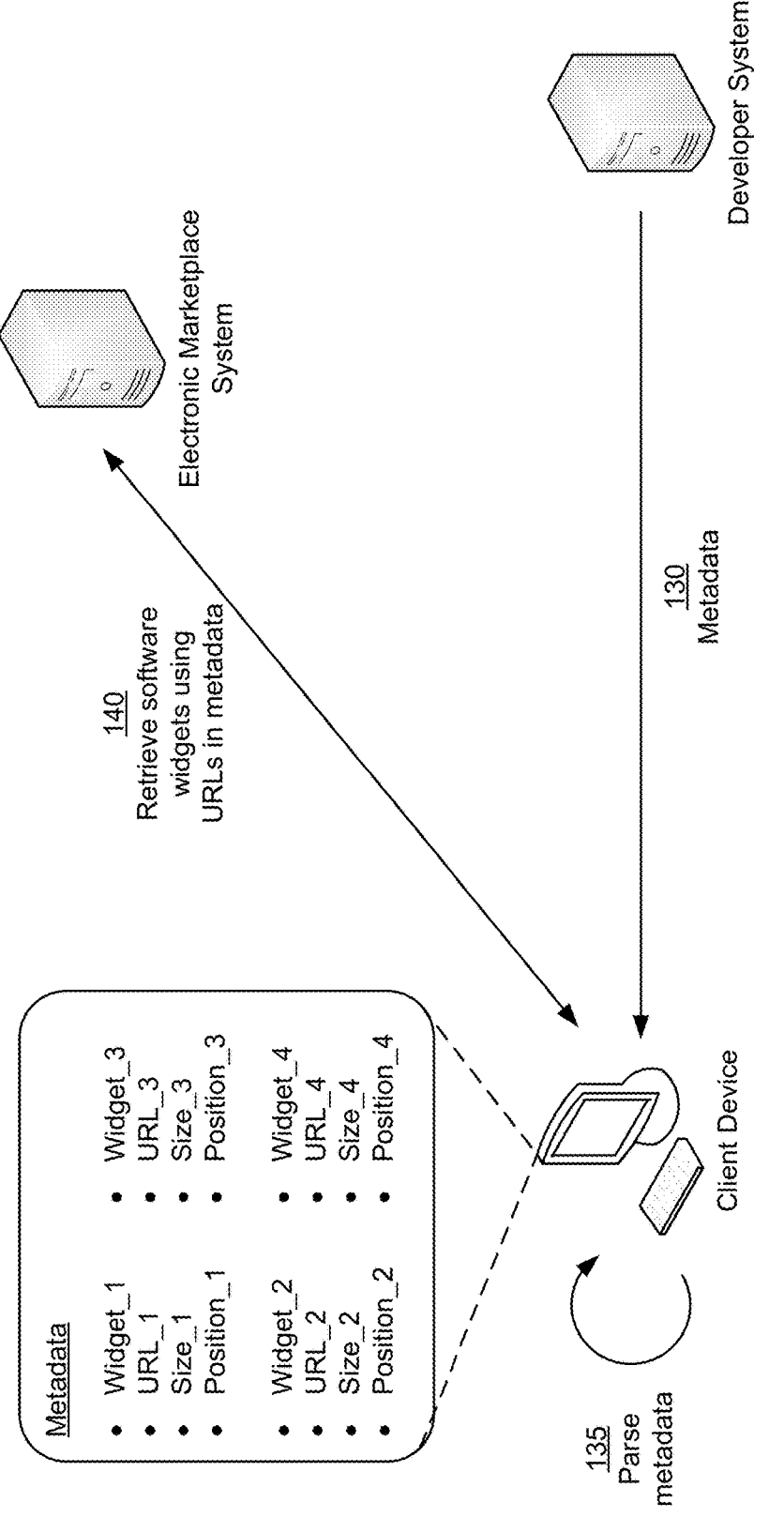

As shown in FIG. 1C, and by reference number 130, the client device may receive, from the developer system, the metadata associated with the page link based on the selection of the page link on the electronic page. The metadata may be a data file that is retrievable by the client device based on the selection of the page link associated with the metadata. The page link, such as a URL, may specify a location associated with the metadata, and the selection of the page link may enable the client device to retrieve the metadata from that location.

As shown by reference number 135, the client device may parse the metadata to identify information contained in the metadata. The client device may parse the metadata to identify, for each of the software widgets defined by the metadata, a widget name associated with a software widget, a widget link associated with the software widget, a size of the software widget on the graphical user interface, and a position of the software widget on the graphical user interface. The widget name may describe a type or purpose of the software widget. The widget link may be a URL that is associated with a location of the software widget. In some cases, the location may correspond to an executable file associated with the software widget. The size of the software widget and/or the position of the software widget may correspond to a relative priority of the software widget in relation to other software widgets that are defined in the metadata. The metadata may be a text file that is readable by the client device.

As an example, the client device may parse the metadata to identify, for a first software widget, a first widget name, a first URL, a first size, and a first position. The client device may parse the metadata to identify, for a second software widget, a second widget name, a second URL, a second size, and a second position. The client device may parse the metadata to identify, for a third software widget, a third widget name, a third URL, a third size, and a third position. The client device may parse the metadata to identify, for a fourth software widget, a fourth widget name, a fourth URL, a fourth size, and a fourth position.

As shown by reference number 140, the client device may retrieve the software widgets based on the metadata. For example, the client device may access, for each software widget indicated in the metadata, the widget link (e.g., the URL) to download the software widget onto the client device. The client device may receive the software widget, or an executable file associated with the software widget, from the electronic marketplace system. In other words, the client device may receive the software widget from the electronic marketplace system based on the widget link associated with the software widget being directed to the electronic marketplace system. Alternatively, the client device may receive the software widget from the developer system, based on the widget link associated with the software widget being directed to the developer system.

In some implementations, the developer system may create the software widgets and upload the software widgets to the electronic marketplace system. In this example, the electronic marketplace system may facilitate a download of the software widgets, as opposed to the developer system that creates the software widgets.

Figure 1D:
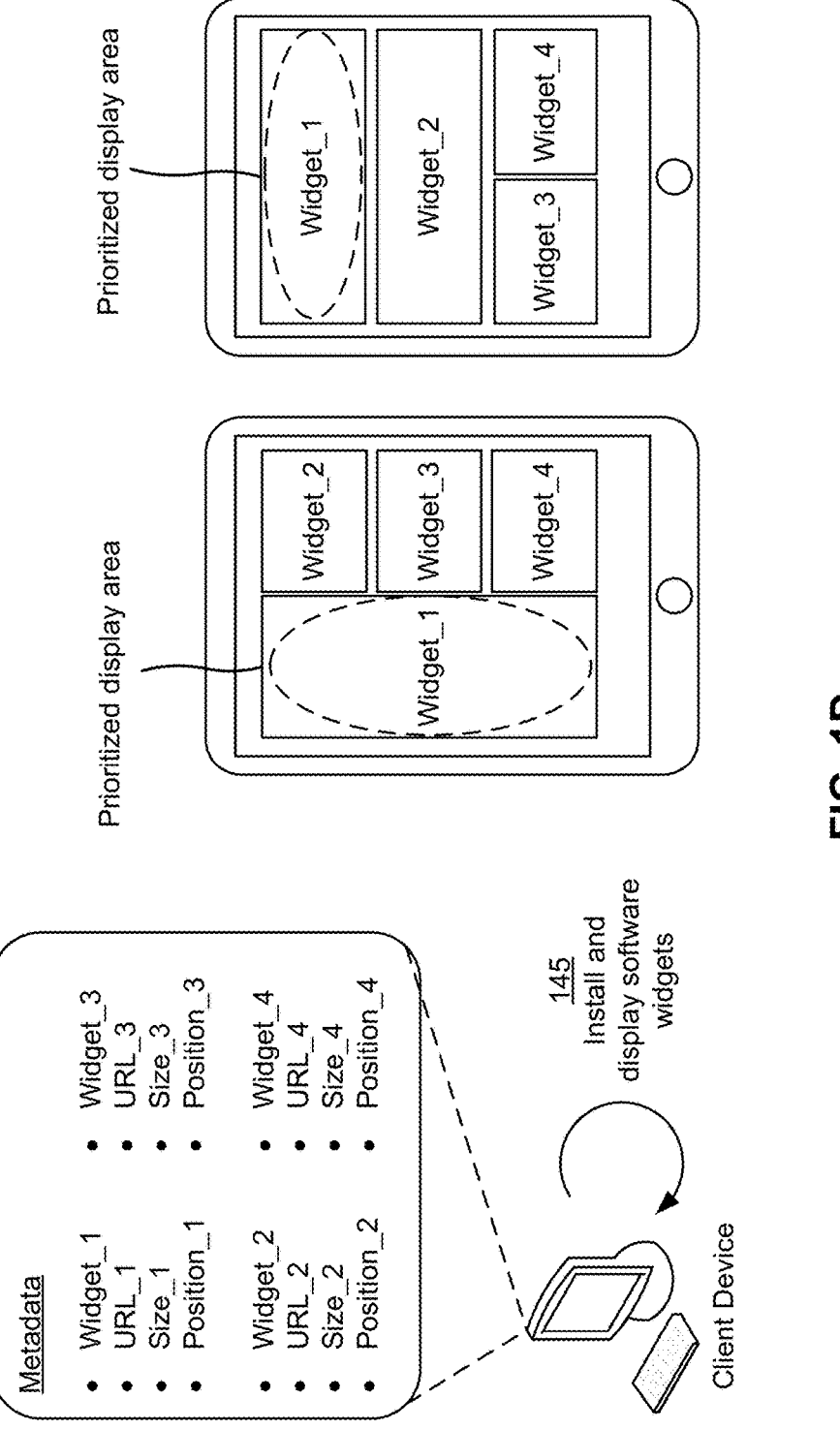

As shown in FIG. 1D, and by reference number 145, the client device may install and display the software widgets. The client device may display the software widgets on the graphical user interface of the client device, such as on a next available navigation pane window of the graphical user interface. The client device may display the software widgets on the graphical user interface based on corresponding sizes and positions of the software widgets, as indicated in the metadata. The corresponding sizes and positions may be based on priority levels associated with the software widgets in relation to other software widgets that are downloaded, installed, and displayed on the client device.

In some implementations, a size of a first software widget on the graphical user interface may be larger than a size of a second software widget on the graphical user interface based on the first software widget being prioritized over the second software widget. The size of the first software widget may be two times, three times, four times, etc., as that of the second software widget, depending on a difference in priority between the first software widget and the second software widget.

In some implementations, a position of a first software widget on the graphical user interface may be closer to a prioritized display area of the graphical user interface as compared to a position of a second software widget on the graphical user interface based on the first software widget being prioritized over the second software widget. The prioritized display area may be user defined or defined by the metadata. The prioritized display area may correspond to an upper portion of the graphical user interface, a lower portion of the graphical user interface, a central portion of the graphical user interface, a left portion of the graphical user interface, or a right portion of the graphical user interface.

In some implementations, a position of a first software widget and a position of a second software widget on the graphical user interface may be based on a logical relationship between information provided by the first software widget and the second software widget. For example, when the user is likely to benefit from receiving information from the first software widget before receiving information from the second software widget, the first software widget may be positioned ahead of the second software widget on the graphical user interface.

As an example, the client device may display a first software widget, a second software widget, a third software widget, and a fourth software widget. The first software widget may have a size of 1×4, and a priority that is greater than that of the second software widget, the third software widget, and the fourth software widget. As a result, the first software widget may be displayed in a prioritized display area of the graphical user interface. The second, third, and fourth software widgets may each have a size of 1×1, and equal priorities with respect to each other, such that the second, third, and fourth software widgets are displayed outside of the prioritized display area.

As another example, the client device may display a first software widget, a second software widget, a third software widget, and a fourth software widget. The first software widget may have a size of 4×1, and a priority that is greater than that of the second software widget, the third software, and the fourth software widget. As a result, the first software widget may be displayed in a prioritized display area of the graphical user interface. The second software widget may have a size of 4×1, and a priority that is greater than that of the third and fourth software widgets, but not the first software widget. The second software widget may be displayed outside of the prioritized display area, but closer to the prioritized display area as compared to the third and fourth software widgets. The third and fourth software widgets may each have a size of 1×1, and equal priorities with respect to each other, such that the third and fourth software widgets are displayed outside of the prioritized display area and further away from the prioritized display area as compared to the second software widget.

In some implementations, the client device may receive the software widgets from the electronic marketplace system and/or the developer system in parallel, and the client device may install the software widgets in parallel. Alternatively, the client device may receive and install the software widgets in a serial manner. For example, a first software widget may be downloaded, installed, and displayed on the graphical user interface, a second software widget may be downloaded, installed, and displayed on the graphical user interface, and so on.

In some implementations, the software widgets may be displayed based on the corresponding sizes and positions indicated in the metadata, but the sizes and/or positions of the software widgets on the graphical user interface may be manually adjusted by the user of the client device. For example, the sizes and/or positions of the software widgets may be modified based on a personal preference of the user.

In some implementations, the client device may install, configure, and display multiple software widgets based on metadata associated with the software widgets, thereby improving an installation process for the user of the client device. Rather than manually selecting, downloading, and configuring a display for each of the software widgets, the client device may simply receive a page link to the metadata associated with the software widgets. The client device may be configured to read the metadata and retrieve software widgets indicated in the metadata. The client device may display the software widgets based on corresponding sizes and positions indicated in the metadata, thereby saving the user from manually configuring the display for each software widget. As a result, a software widget installation process may be a more seamless and enjoyable experience for the user of the client device, as well as save compute and network resources for the client device, due to less time spent browsing for suitable software widgets and less time spent rearranging and configuring the software widgets on the client device.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

FIG. 2 is a diagram of an example 200 associated with metadata relating to installing a software widget on a client device. The metadata shown in FIG. 2 may be created by the developer system and received at the client device, as described above in connection with FIGS. 1A-1E.

As shown in FIG. 2, the metadata may be a text file that includes information for multiple software widgets. For example, for a first software widget, the metadata may indicate a name of 'checking account widget', a corresponding URL, a size of 'medium; 2×2', and a position of 'x,1; y,1'. For a second software widget, the metadata may indicate a name of 'credit score widget', a corresponding URL, a size of 'medium; 2×2', and a position of 'x,3; y,1'.

For a third software widget, the metadata may indicate a name of 'savings goals widget', a corresponding URL, a size of 'wide; 4×1', and a position of 'x,1; y,3'. The metadata may indicate an appropriate operating system for the software widgets. The metadata may indicate that the software widgets are to be displayed on a next available navigation pane.

In some implementations, a client device may parse the metadata, and identify for each software widget, a corresponding URL, a size, and a position. The client device may be configured to access the URLs, as indicated in the metadata, to download the software widgets associated with the URLs. Further, the client device may be configured to display the software widgets in accordance with the sizes and positions indicated in the metadata.

As indicated above, FIG. 2 is provided as an example. Other examples may differ from what is described with regard to FIG. 2.

Figure 3:
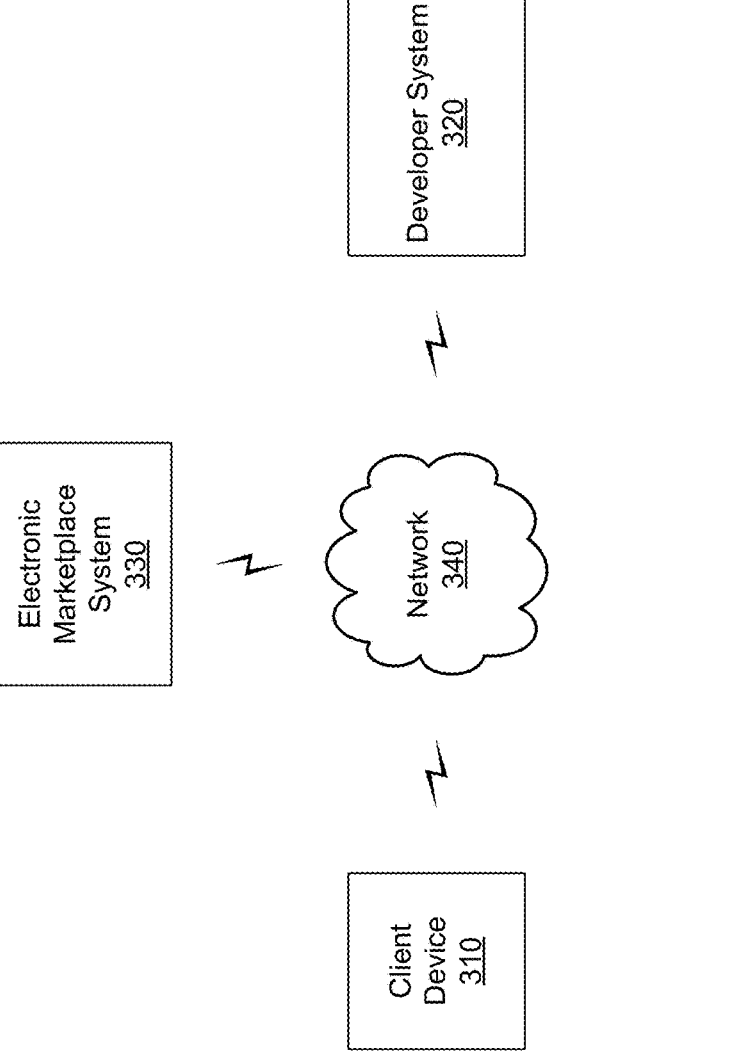
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a client device 310, a developer system 320, an electronic marketplace system 330, and a network 340. Devices of environment 300 may interconnect via wired connections, wireless connections, or a combination of wired and wireless connections.

The client device 310 includes one or more devices capable of receiving, generating, storing, processing, and/or providing information associated with installing a software widget on a client device, as described elsewhere herein. The client device 310 may include a communication device and/or a computing device. For example, the client device 310 may include a wireless communication device, a phone such as a smart phone, a mobile phone or a video phone, a user equipment, a laptop computer, a tablet computer, a desktop computer, a television, a gaming console, or a similar type of device.

The developer system 320 includes one or more devices capable of receiving, generating, storing, processing, providing, and/or routing information associated with installing a software widget on a client device, as described elsewhere herein. The developer system 320 may include a communication device and/or a computing device. For example, the developer system 320 may include a server, such as an application server, a client server, a web server, a database server, a host server, a proxy server, a virtual server (e.g., executing on computing hardware), a server in a cloud computing system, a device that includes computing hardware used in a cloud computing environment, or a similar type of device. In some implementations, the developer system 320 includes computing hardware used in a cloud computing environment.

The electronic marketplace system 330 includes one or more devices capable of receiving, generating, storing, processing, providing, and/or routing information associated with installing a software widget on a client device, as described elsewhere herein. The electronic marketplace system 330 may include a communication device and/or a computing device. For example, the electronic marketplace system 330 may include a server, such as an application server, a client server, a web server, a database server, a host server, a proxy server, a virtual server (e.g., executing on computing hardware), a server in a cloud computing system, a device that includes computing hardware used in a cloud computing environment, or a similar type of device. In some implementations, the electronic marketplace system 330 includes computing hardware used in a cloud computing environment.

The network 340 includes one or more wired and/or wireless networks. For example, the network 340 may include a cellular network, a public land mobile network, a local area network, a wide area network, a metropolitan area network, a telephone network, a private network, the Internet, and/or a combination of these or other types of networks. The network 340 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
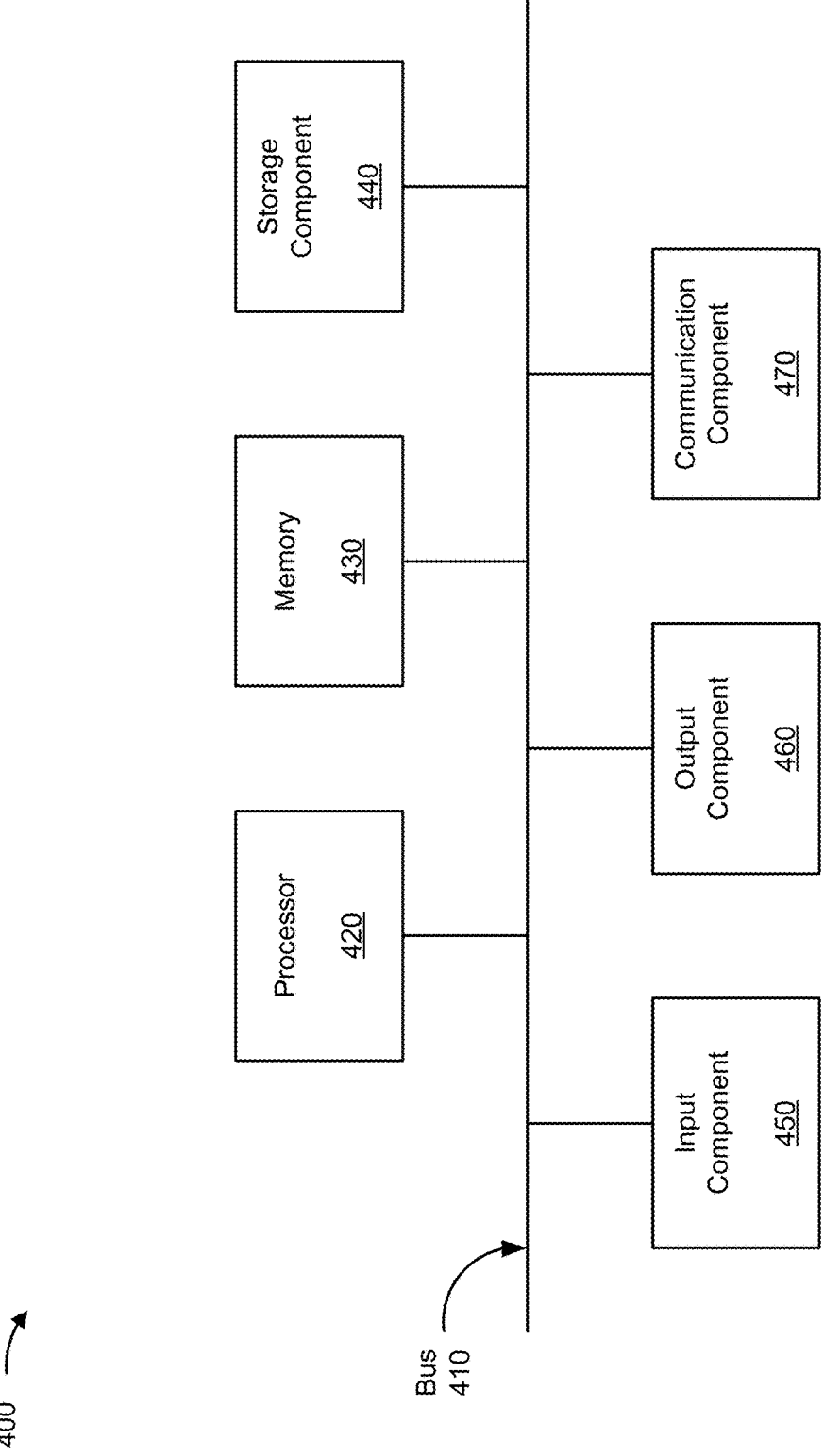
FIG. 4 is a diagram of example components of one or more devices of FIG. 3.

FIG. 4 is a diagram of example components of a device 400, which may correspond to the client device 310, developer system 320, and/or the electronic marketplace system 330. In some implementations, the client device 310, developer system 320, and/or the electronic marketplace system 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hard-wired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with software widget installation on a client device. In some implementations, one or more process blocks of FIG. 5 may be performed by a client device (e.g., client device 310). In some implementations, one or more process blocks of FIG. 5 may be performed by another device or a group of devices separate from or including the client device, such as developer system 320 and/or electronic marketplace system 330. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving, at a client device from a developer system, a page link to obtain a plurality of related software widgets (block 510). As further shown in FIG. 5, process 500 may include receiving, via a graphical user interface of the client device, a selection of the page link (block 520). As further shown in FIG. 5, process 500 may include receiving, at the client device and from the developer system, metadata associated with the page link (block 530). The metadata may indicate, for each of the plurality of related software widgets, a widget name associated with the software widget, a widget link to download an executable file associated with the software widget, a size of the software widget on the graphical user interface, and a position of the software widget on the graphical user interface. As further shown in FIG. 5, process 500 may include receiving, at the client device, the plurality of related software widgets based on the metadata (block 540). As further shown in FIG. 5, process 500 may include installing the plurality of related software widgets on the client device (block 550). The plurality of related software widgets may be configured to be displayed on a next available navigation pane window of the graphical user interface in accordance with corresponding sizes and positions indicated in the metadata.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:

one or more memories; and one or more processors, coupled to the one or more memories, configured to:

determine, by a device and based on one or more search queries, a plurality of related software widgets that are of interest, wherein the one or more search queries include one or more search terms describing interests of a user;

transmit, by the device and based on the one or more search queries, one or more search results that indicate the plurality of related software widgets, wherein the one or more search results include a page link associated with the plurality of related software widgets;

generate, by the device and based on selection of the page link, metadata associated with a corresponding widget of the plurality of related software widgets, a widget link associated with downloading an executable file related to the corresponding widget, a size of the corresponding widget, and a position associated with the corresponding widget;

transmit, by the device and based on the generating the metadata, the metadata associated with the page link;

cause, by the device and based on the widget link determined by parsing the metadata by a processor configured to automatically extract, for each widget, a widget name, widget link, size, and position from the metadata, the executable file related to the corresponding widget to be retrieved from another device related to the plurality of related software widgets; and cause, based on the widget link, a set of executable files associated with a set of the plurality of related software widgets to be installed, and the plurality of related software widgets to be displayed, wherein the set of the plurality of related software widgets include the corresponding widget, wherein the set of the plurality of related software widgets are configured to be displayed on a next available navigation pane window of a graphical user interface of another device automatically, based on information related to corresponding sizes and positions and a prioritized display area indicated in the metadata, wherein a corresponding position of a related software widget of the set of the plurality of related software widgets is closer to the prioritized display area than another related software widget of the set of the plurality of related software widgets based on a higher priority level of the related software widget compared with a lower priority level of the another related software widget, and wherein a corresponding size of the related software widget with the higher priority level is larger compared to the another related software widget with the lower priority level.

2. The system of claim 1, wherein the one or more processors are further configured to:

receive information indicating topics of interest, wherein the plurality of related software widgets are further selected based on the information indicating topics of interest.

3. The system of claim 1, wherein the one or more processors are further configured to:

receive widget layout preference information indicating that the set of the plurality of related software widgets is to be displayed on the next available navigation pane window.

4. The system of claim 1, wherein an electronic page, that is associated with the page link, includes an advertisement that is transmitted when the electronic page is being accessed.

5. The system of claim 1, wherein the one or more search queries are associated with a common topic.

6. The system of claim 1, wherein the positions of the set of the plurality of related software widgets are further based on logical relationships between widgets of the plurality of related software widgets.

7. The system of claim 1, wherein the prioritized display area is on a side of graphical user interface.

8. A non-transitory computer-readable medium storing a set of instructions, the set of instructions comprising:

one or more instructions that, when executed by one or more processors of a device, cause the device to:

determine, based on one or more search queries, a plurality of related software widgets that are of interest, wherein the one or more search queries include one or more search terms describing interests of a user;

transmit, based on the one or more search queries, one or more search results that indicate the plurality of related software widgets, wherein the one or more search results include a page link associated with the plurality of related software widgets;

generate, based on selection of the page link, metadata associated with a corresponding widget of the plurality of related software widgets, a widget link associated with downloading an executable file related to the corresponding widget, a size of the corresponding widget, and a position associated with the corresponding widget;

transmit, based on the generating the metadata, the metadata associated with the page link;

cause, based on the widget link determined by parsing the metadata by a processor configured to automatically extract, for each widget, a widget name, widget link, size, and position from the metadata, the executable file related to the corresponding widget to be retrieved from another device related to the plurality of related software widgets; and cause, based on the widget link, a set of executable files associated with a set of the plurality of related software widgets to be installed, and the plurality of related software widgets to be displayed, wherein the set of the plurality of related software widgets include the corresponding widget, wherein the set of the plurality of related software widgets are configured to be displayed on a next available navigation pane window of a graphical user interface of another device automatically, based on information related to corresponding sizes and positions and a prioritized display area indicated in the metadata, wherein a corresponding position of a related software widget of the set of the plurality of related software widgets is closer to the prioritized display area than another related software widget of the set of the plurality of related software widgets based on a higher priority level of the related software widget compared with a lower priority level of the another related software widget and wherein a corresponding size of the related software widget with the higher priority level is larger compared to the another related software widget with the lower priority level.

9. The non-transitory computer-readable medium of claim 8, wherein the widget link indicates a link to download the executable file associated with the corresponding widget.

10. The non-transitory computer-readable medium of claim 8, wherein the one or more instructions further cause the device to:

receive information indicating topics of interest, wherein the plurality of related software widgets are further selected based on the information indicating topics of interest.

11. The non-transitory computer-readable medium of claim 8, wherein the one or more instructions further cause the device to:

receive widget layout preference information indicating that the set of the plurality of related software widgets is to be displayed on the next available navigation pane window.

12. The non-transitory computer-readable medium of claim 8, wherein an electronic page, that is associated with the page link, includes an advertisement that is transmitted when the electronic page is being accessed.

13. The non-transitory computer-readable medium of claim 8, wherein the one or more search queries are associated with a common topic.

14. The non-transitory computer-readable medium of claim 8, wherein the prioritized display area is on a side of graphical user interface.

15. A method, comprising:

determining, by a device and based on one or more search queries, a plurality of related software widgets that are of interest, wherein the one or more search queries include one or more search terms describing interests of a user;

transmitting, by the device and based on the one or more search queries, one or more search results that indicate the plurality of related software widgets, wherein the one or more search results include a page link associated with the plurality of related software widgets;

generating, by the device and based on selection of the page link, metadata associated with a corresponding widget of the plurality of related software widgets, a widget link associated with downloading an executable file related to the corresponding widget, a size of the corresponding widget, and a position associated with the corresponding widget;

transmitting, by the device and based on the generating the metadata, the metadata associated with the page link;

causing, by the device and based on the widget link determined by parsing the metadata by a processor configured to automatically extract, for each widget, a widget name, widget link, size, and position from the metadata, the executable file related to the corresponding widget to be retrieved from another device related to the plurality of related software widgets; and causing, based on the widget link, a set of executable files associated with a set of the plurality of related software widgets to be installed, and the plurality of related software widgets to be displayed, wherein the set of the plurality of related software widgets include the corresponding widget, wherein the set of the plurality of related software widgets are configured to be displayed on a next available navigation pane window of a graphical user interface of another device automatically, based on information related to corresponding sizes and positions and a prioritized display area indicated in the metadata, wherein a corresponding position of a related software widget of the set of the plurality of related software widgets is closer to the prioritized display area than another related software widget of the set of the plurality of related software widgets based on higher priority level of the related software widget compared with a lower priority level of the another related software widget, and wherein a corresponding size of the related software widget with the higher priority level is larger compared to the another related software widget with the lower priority level.

16. The method of claim 15, wherein the widget link indicates a link to download the executable file associated with the corresponding widget.

17. The method of claim 15, further comprising: receiving information indicating topics of interest, wherein the plurality of related software widgets are further selected based on the information indicating topics of interest.

18. The method of claim 15, further comprising: receiving widget layout preference information indicating that the set of the plurality of related software widgets is to be displayed on the next available navigation pane window.

19. The method of claim 15, wherein an electronic page, that is associated with the page link, includes an advertisement that is transmitted when the electronic page is being accessed.

20. The method of claim 15, wherein the prioritized display area is on a side of graphical user interface.

* * * * *